(12) United States Patent
Mitsubori et al.

(10) Patent No.: US 10,024,384 B2
(45) Date of Patent: Jul. 17, 2018

(54) POWERTRAIN STRUCTURE INCLUDING TORQUE DAMPER DISPOSED BETWEEN DRIVE AND DRIVEN SHAFTS

(71) Applicant: HONDA MOTOR CO., LTD., Minato-Ku, Tokyo (JP)

(72) Inventors: Toshimasa Mitsubori, Wako (JP); Shinya Nishiyama, Wako (JP); Naoki Kobayashi, Wako (JP); Dai Arai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 378 days.

(21) Appl. No.: 14/853,698

(22) Filed: Sep. 14, 2015

(65) Prior Publication Data
US 2016/0076598 A1 Mar. 17, 2016

(30) Foreign Application Priority Data

Sep. 16, 2014 (JP) ................................. 2014-187198

(51) Int. Cl.
*F16D 3/04* (2006.01)
*F16D 3/12* (2006.01)
(Continued)

(52) U.S. Cl.
CPC .......... *F16F 15/1206* (2013.01); *F16D 1/101* (2013.01); *F16D 3/04* (2013.01); *F16D 3/12* (2013.01); *F16F 15/12* (2013.01); *F16F 15/12306* (2013.01); *F16H 3/006* (2013.01); *F16H 37/043* (2013.01);
(Continued)

(58) Field of Classification Search
CPC ... F16D 1/101; F16D 3/04; F16D 3/12; F16D 2001/103; F16F 15/12; F16F 15/1206; F16F 15/123; F16F 15/12306; F16F 15/13157; F16F 15/134; F16F 15/13407;
(Continued)

(56) References Cited

U.S. PATENT DOCUMENTS 272,947 A * 2/1883 Ewart ............... F16F 15/12313
192/212
2,096,039 A * 10/1937 Higgins .................... F16D 3/52
464/61.1
(Continued)

FOREIGN PATENT DOCUMENTS

| GB | 1199175 A | * | 7/1970 | ............... F16D 3/80 |
| JP | 2014-051120 A | | 3/2014 | |
| WO | WO 2009015633 A1 | * | 2/2009 | ........... F16H 3/0915 |

*Primary Examiner* — Josh Skroupa
(74) *Attorney, Agent, or Firm* — Carrier Blackman & Associates, P.C.; Joseph P. Carrier; Jingli Wang

(57) ABSTRACT

A powertrain structure includes a drive shaft and a driven shaft disposed coaxially, with end surfaces opposed to each other, and a torque damper interposed between the shafts and having half bodies fitted to a shaft end parts of the drive and driven shafts, with the half bodies joined together by engagement of opposed, outer circumferential end surfaces thereof and a damper spring interposed therebetween such that it straddles drive-side and driven-side spring recesses respectively formed in the opposed surfaces of the half bodies. One of two fitting parts provided between the half bodies and the respective shafts has a smaller clearance and the other has an larger clearance in the radial direction of the shafts.

19 Claims, 10 Drawing Sheets

(51) Int. Cl.
*F16F 15/12* (2006.01)
*F16F 15/123* (2006.01)
*F16D 1/10* (2006.01)
*F16H 3/00* (2006.01)
*F16H 37/04* (2006.01)

(52) U.S. Cl.
CPC .. *F16D 2001/103* (2013.01); *F16H 2200/006* (2013.01); *Y10T 403/7026* (2015.01)

(58) Field of Classification Search
CPC .... F16H 3/006; F16H 37/043; F16H 57/0006; F16H 2200/006; Y10T 403/7026–403/7035
USPC ....... 464/16, 66.1, 68.1, 154, 157–159, 180; 403/359.1–359.6
See application file for complete search history.

(56) References Cited

U.S. PATENT DOCUMENTS

| | | | | |
|---|---|---|---|---|
| 2,436,248 A * | 2/1948 | Cardillo | ................... | F16D 3/66 |
| | | | | 464/66.1 |
| 3,080,733 A * | 3/1963 | Crankshaw | ............... | F16D 3/52 |
| | | | | 464/63.1 |
| 3,691,792 A * | 9/1972 | Corwin | ................... | F16D 3/64 |
| | | | | 464/66.1 |
| 4,171,627 A * | 10/1979 | Fukuda | ................... | F16D 3/66 |
| | | | | 464/117 |
| 9,133,885 B2 * | 9/2015 | Steinberger | ............... | F16D 3/14 |
| 9,303,751 B2 * | 4/2016 | Steinberger | ............. | F16H 55/14 |
| 9,506,563 B2 * | 11/2016 | Mitsubori | ........... | F16H 63/3416 |
| 9,664,272 B2 * | 5/2017 | Kudo | ..................... | F16H 55/14 |

* cited by examiner

POWERTRAIN STRUCTURE INCLUDING TORQUE DAMPER DISPOSED BETWEEN DRIVE AND DRIVEN SHAFTS

CROSS-REFERENCE TO RELATED APPLICATIONS

The present invention claims priority under 35 USC 119 based on Japanese patent application No. 2014-187198, filed on Sep. 16, 2014. The entire subject matter of this priority document, including specification claims and drawings thereof, is incorporated by reference herein.

BACKGROUND OF THE INVENTION

1. Field of the Invention

The present invention relates to a powertrain structure in which power is transmitted from a drive shaft to a driven shaft via a torque damper.

2. Background Art

As a powertrain structure in which power is transmitted between coaxially disposed drive and driven shafts via a torque damper, one is known in which a shaft end of one of a shaft end part of the drive shaft and a shaft end part of the driven shaft is inserted into a shaft hole of the other to join the drive shaft and the driven shaft to each other, and such that the center axes of the drive shaft and the driven shaft may be kept coaxial with each other (refer to e.g. Japanese Patent Laid-Open No. 2014-51120).

Japanese Patent Laid-Open No. 2014-51120 discloses a powertrain structure in which a main shaft in a transmission of a power unit is divided into a first main shaft (drive shaft) and a second main shaft (driven shaft) that are disposed coaxially with each other and a clutch and a torque damper are interposed between the first and second main shafts. A shaft end part of the first main shaft has a decreased diameter and is inserted into a shaft hole with an increased diameter formed in the end part of the second main shaft with the intermediary of a needle bearing, whereby the first main shaft and the second main shaft are coaxially joined to each other to each other in a relative rotatably manner.

The respective fitting parts of the first and second main shafts disclosed in Japanese Patent Laid-Open No. 2014-51120 are pivotally supported by a crankcase with the intermediary of a bearing, and another shaft end part of the first main shaft is pivotally supported by a front cover attached to the crankcase with the intermediary of a bearing. Furthermore, the first main shaft and the second main shaft are pivotally supported by a monolithic support case so that the center axes thereof are kept coaxial with each other structurally.

However, if some sort of external force is applied to the front cover and the front cover gets distorted even somewhat, the coaxial disposition of the center axes of the first main shaft and the second main shaft is deteriorated and a stress other than rotational torque via the torque damper is applied to the fitting parts of the first main shaft and the second shaft, which precludes smooth power transmission, in some cases. In particular, if the drive shaft and the driven shaft are pivotally supported by support cases as separate bodies from each other, it is often difficult to keep the center axes thereof coaxial with each other.

SUMMARY OF THE INVENTION

The present invention is made in view of such a point and an object thereof is to provide a powertrain structure that can absorb stress other than rotational torque via a torque damper and maintain smooth power transmission in an arrangement in which a drive shaft and a driven shaft are coaxially disposed, with end surfaces opposed to each other.

To achieve the above-described object, according to a first aspect of the present invention there is provided a powertrain structure comprising: a drive shaft and a driven shaft disposed coaxially, with end surfaces opposed to each other, and a torque damper interposed between the drive and driven shafts which permits power to be transmitted from the drive shaft to the driven shaft, wherein the torque damper includes a drive-side damper half body fitted to a shaft end part of the drive shaft and a driven-side damper half body fitted to a shaft end part of the driven shaft, with the damper half bodies joined together by engagement of outer circumferential end surfaces of the respective half bodies which are opposed to each other, and
a damper spring interposed between the damper half bodies such that the damper spring straddles both a drive-side spring recess and a driven-side spring recess respectively formed, with openings opposed to each other, in the opposing circumferential end surfaces of the drive-side damper half body and the driven-side damper half body, and wherein one of a drive-side fitting part between the drive-side damper half body and the shaft end part of the drive shaft and a driven-side fitting part between the driven-side damper half body and the shaft end part of the driven shaft has a negligible clearance in a radial direction of the shafts, and the other of the drive-side fitting part and the driven-side fitting part has an appreciable clearance in the radial direction of the shafts.

According to a second aspect of the present invention, and in addition to the first aspect, the drive-side fitting part and the driven-side fitting part are both splined, a groove depth of a spline of the one of the fitting parts having the negligible clearance is shallow, and a groove depth of a spline of the other of the fitting parts having the appreciable clearance is deep.

According to a third aspect of the present invention, and in addition to the first or second aspect, rotation center axes of the drive-side damper half body and the driven-side damper half body are aligned to be coaxial with each other, and an axis alignment recess and an axis alignment projection are respectively formed opposed to each other in the opposing circumferential end surfaces of the drive-side damper half body and the driven-side damper half body such that the projection and the recess contact with each other slidably in a relative rotation direction of the shafts when the damper half bodies are joined together, and such that the drive-side damper half body and the driven-side damper half body are also rotatable relative to each other.

According to a fourth aspect of the present invention, and in addition to the first-third aspects, the torque damper includes a plurality of the damper springs interposed at equal intervals in circumferential direction of the damper half bodies such that the damper springs straddle the drive-side damper half body and the driven-side damper half body, and the axis alignment recess and the axis alignment projection are formed between adjacent ones of the damper springs in the circumferential direction.

According to a fifth aspect of the present invention, and in addition to the first-fourth aspects, a relative rotation restricting projection and a relative rotation restricting recess are formed opposed to each other in respective ones of the surfaces opposed to each other of the drive-side damper half body and the driven-side damper half body, and the relative rotation restricting projection and the relative rotation restricting recess are loosely fitted together such that they restrict the relative rotation between the drive-side damper half body and the driven-side damper half body to a predetermined range.

According to a sixth aspect of the present invention, and in addition to the first-fifth aspects, the relative rotation restricting projection and the relative rotation restricting recess are disposed at such positions of the opposed surfaces of the damper half bodies as not to interfere with the axis alignment recess and the axis alignment projection between adjacent ones of the damper springs.

According to a seventh aspect of the present invention, and in addition to any of the first-sixth aspects, the powertrain structure further comprises a drive-side support case which rotatably supports the drive shaft and driven-side support cases which rotatably support the driven shaft, and the drive-side damper half body and the driven-side damper half body are fitted to respective ones of the shaft end parts which protrude outwardly of the powertrain structure.

Effects of the Invention

According to the drive torque damper structure of a power unit in accordance with the first aspect of the present invention, the drive shaft and the driven shaft are disposed coaxially, with end surfaces opposed to each other, and the torque damper is interposed between the drive and driven shafts which permits power to be transmitted from the drive shaft to the driven shaft. Also, the torque damper includes a drive-side damper half body fitted to a shaft end part of the drive shaft and a driven-side damper half body fitted to a shaft end part of the driven shaft, with the damper half bodies joined together by engagement of outer circumferential end surfaces of the respective half bodies which are opposed to each other, and a damper spring is interposed between the damper half bodies such that the damper spring straddles both a drive-side spring recess and a driven-side spring recess respectively formed, with openings opposed to each other, in the opposing circumferential end surfaces of the drive-side damper half body and the driven-side damper half body. Furthermore, one of a drive-side fitting part between the drive-side damper half body and the shaft end part of the drive shaft and a driven-side fitting part between the driven-side damper half body and the shaft end part of the driven shaft has a negligible clearance in a radial direction of the shafts, and the other of the drive-side fitting part and the driven-side fitting part has an appreciable clearance in the radial direction of the shafts. By such appreciable clearance there is room to allow the shaft body and the damper half body to move relative to each other in the radial direction. Therefore, even when some misalignment or distortion is caused in the center axes of the drive shaft and the driven shaft, stress other than rotational torque via the torque damper is absorbed and smooth power transmission can be maintained.

According to the drive torque damper structure of a power unit in accordance with the second aspect of the present invention, the drive-side fitting part and the driven-side fitting part are both splined, a groove depth of a spline of the one of the fitting parts having the negligible clearance is shallow, and a groove depth of a spline of the other of the fitting parts having the appreciable clearance is deep. Therefore, there is room to allow the shaft body and the damper half body to move relative to each other in the radial direction, and the splined fitting can be easily maintained even when comparatively-large relative movement is made between the fitted components.

According to the drive torque damper structure of a power unit in accordance with the third aspect of the present invention, rotation center axes of the drive-side damper half body and the driven-side damper half body are aligned to be coaxial with each other, and an axis alignment recess and an axis alignment projection are respectively formed opposed to each other in the opposing circumferential end surfaces of the drive-side damper half body and the driven-side damper half body such that the projection and the recess contact with each other slidably in a relative rotation direction of the shafts when the damper half bodies are joined together, such that the drive-side damper half body and the driven-side damper half body are also rotatable relative to each other. Thus, even when positional misalignment due to distortion or the like is caused in the shaft body having room to move relative to the damper half body in the radial direction, the damper half body experiences no backlash, which can prevent the damper half body from abutting against the shaft body to make noise.

According to the drive torque damper structure of a power unit in accordance with the fourth aspect of the present invention, the torque damper includes a plurality of the damper springs interposed at equal intervals in circumferential direction of the damper half bodies such that the damper springs straddle the drive-side damper half body and the driven-side damper half body, and the axis alignment recess and the axis alignment projection are formed between adjacent ones of the damper springs in the circumferential direction. Therefore, the axis alignment recess and the axis alignment projection can be formed without enlarging the drive-side damper half body and the driven-side damper half body in the radial direction, whereby size reduction of the torque damper can be achieved.

According to the drive torque damper structure of a power unit in accordance with the fifth aspect of the present invention, the relative rotation restricting projection and the relative rotation restricting recess are formed opposed to each other in respective ones of the surfaces opposed to each other of the drive-side damper half body and the driven-side damper half body, and the relative rotation restricting projection and the relative rotation restricting recess are loosely fitted together such that they restrict the relative rotation between the drive-side damper half body and the driven-side damper half body to a predetermined range. Thus, by the simple structure, the relative rotation can be restricted to a range in which the damper function of the damper spring sufficiently works.

According to the drive torque damper structure of a power unit in accordance with the sixth aspect of the present invention, the relative rotation restricting projection and the relative rotation restricting recess are disposed at such positions of the opposed surfaces of the damper half bodies as not to interfere with the axis alignment recess and the axis alignment projection between adjacent ones of the damper springs. Therefore, the relative rotation restricting projection and the relative rotation restricting recess can be formed without enlarging the drive-side damper half body and the driven-side damper half body in the radial direction and size reduction of the torque damper can be achieved.

According to the drive torque damper structure of a power unit in accordance with the seventh aspect of the present invention, the powertrain structure further comprises a drive-side support case which rotatably supports the drive shaft and driven-side support cases which rotatably support the driven shaft, and the drive-side damper half body and the driven-side damper half body are fitted to respective ones of the shaft end parts which protrude outwardly of the powertrain structure. Therefore, even when the drive-side support case and the driven-side support cases are somewhat relatively displaced and some misalignment or distortion is caused in the center axes of the drive shaft and the driven shaft, stress other than rotational torque via the torque damper is absorbed and smooth power transmission can be maintained.

For a more complete understanding of the present invention, the reader is referred to the following, non-limiting, detailed description section, which describes exemplary embodiments of the present invention and should be read in conjunction with the accompanying drawings. Again, such exemplary embodiments are provided for illustration and better understanding of the present invention and are not intended to limit the invention. Throughout the following detailed description and in the drawings, like numbers refer to like parts.

DETAILED DESCRIPTION OF MODES FOR CARRYING OUT THE INVENTION

Figure 1:
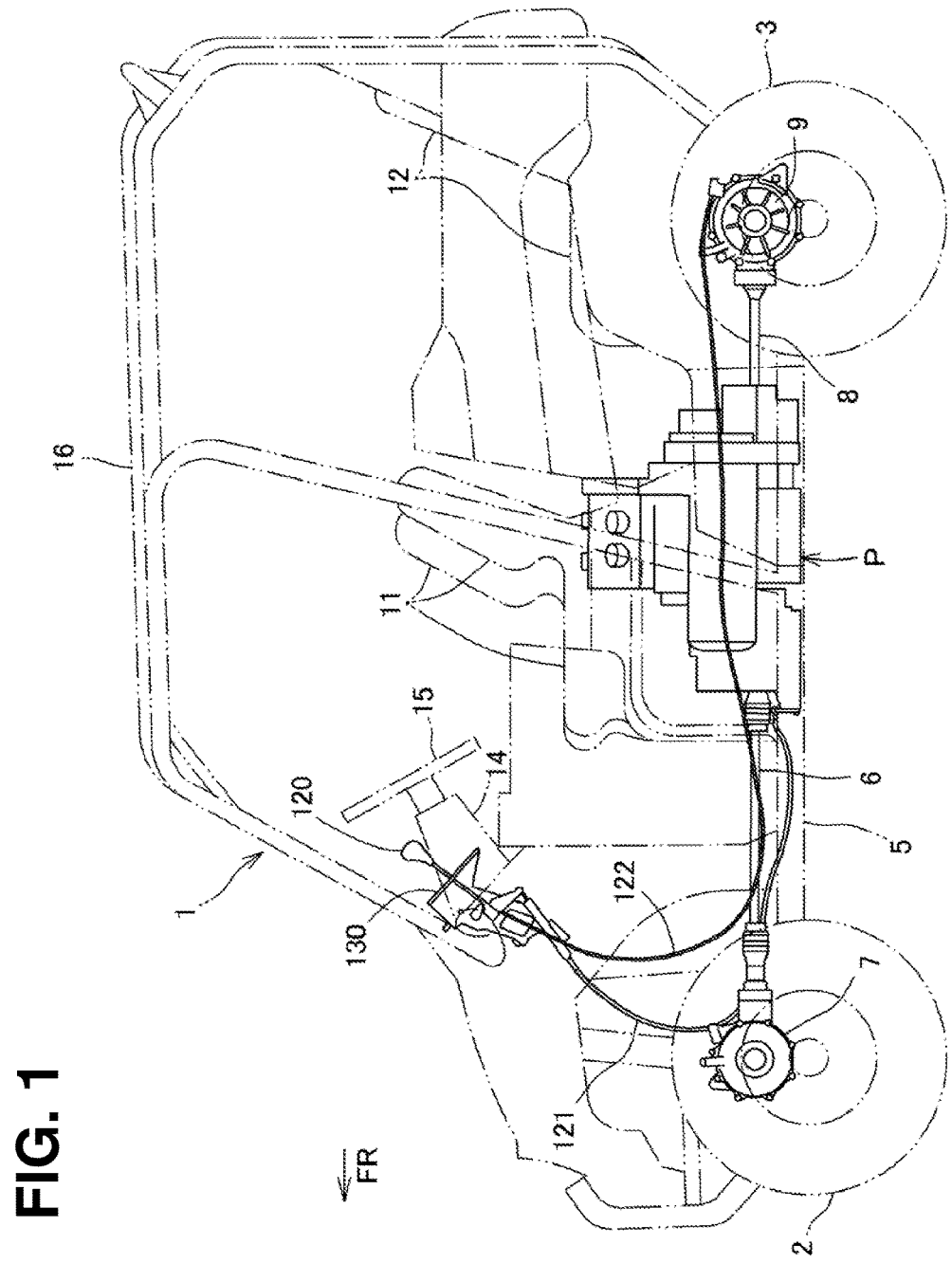
FIG. 1 is a side view of a rough-terrain vehicle in which a power unit according to an exemplary embodiment of the present invention is mounted.

One exemplary embodiment according to the present invention will be described below with reference to FIGS. 1 to 11.

A power unit P according to the present embodiment is mounted in a five-seater, rough-terrain vehicle 1 that allows four-wheel driving and is equipped with a roof. In the description of the present specification, the front, rear, left, and right directions conform to a normal basis in which the straight forward direction of the rough-terrain vehicle 1 according to the present embodiment is defined as the front direction. In the drawings, arrows FR, LH, and RH indicate the vehicle front side, the vehicle left side, and the vehicle right side, respectively.

Referring to FIG. 1, in the rough-terrain vehicle 1, a pair of left and right front wheels 2 and a pair of left and right rear wheels 3 to which low-pressure balloon tires for rough terrain are mounted are suspended on the front and rear sides of a vehicle body frame 5.

The power unit P is mounted at a central position in the vehicle body frame 5 in the front-rear direction, with a crankshaft 21 of an internal combustion engine E oriented along the front-rear direction. An output shaft (gearshift driven shaft) 51 of the power unit P protrudes forward and rearward. Rotational power of the output shaft 51 is transmitted from the front end of the output shaft 51 to the left and right front wheels 2 via a front drive shaft 6 and a front differential 7 and is transmitted from the rear end to the left and right rear wheels 3 via a rear drive shaft 8 and a rear differential 9. Differential lock mechanisms (not shown) are added to the front differential 7 and the rear differential 9, and a clutch that connects and disconnects power transmission to the front wheels and makes switching between two-wheel driving and four-wheel driving is incorporated in the front differential 7.

Three front seats 11 are lined in the left-right direction above the power unit P and two rear seats 12 are disposed as left and right seats at the rear part of the vehicle body frame 5. The center seat among the front seats 11 is a driver's seat and is located slightly closer to the front side than the left and right seats. A steering handle 15 protruding from a steering column 14 is provided on the front side of this driver's seat. A parking operation lever 120 is disposed in an operation panel 130 near the steering column 14. A roof 16 covers the upper side of the front seats 11 and the rear seats 12.

In the power unit P mounted in this rough-terrain vehicle 1, a power train system 20 is formed by combining a main transmission Tm and a sub-transmission Ts with the internal combustion engine E as a straight-two-cylinder, water-cooled, four-stroke engine. The power unit P is mounted on the vehicle body frame 5 with a so-called longitudinal posture in which the crankshaft 21 of the internal combustion engine E is oriented along the vehicle body front-rear direction.

As shown in FIG. 1, a shift cable 121 and a parking cable 122 extend from the parking operation lever 120. The shift cable 121 is linked to the tip of a shift actuation lever 100 whose base end is fitted to a shift spindle 101 protruding to the front side of the sub-transmission Ts (see FIGS. 2-3). On the other hand, the parking cable 122 extends to the vehicle body rear side and is linked to the actuation part of the differential lock mechanism added to the rear differential 9.

Figure 2:
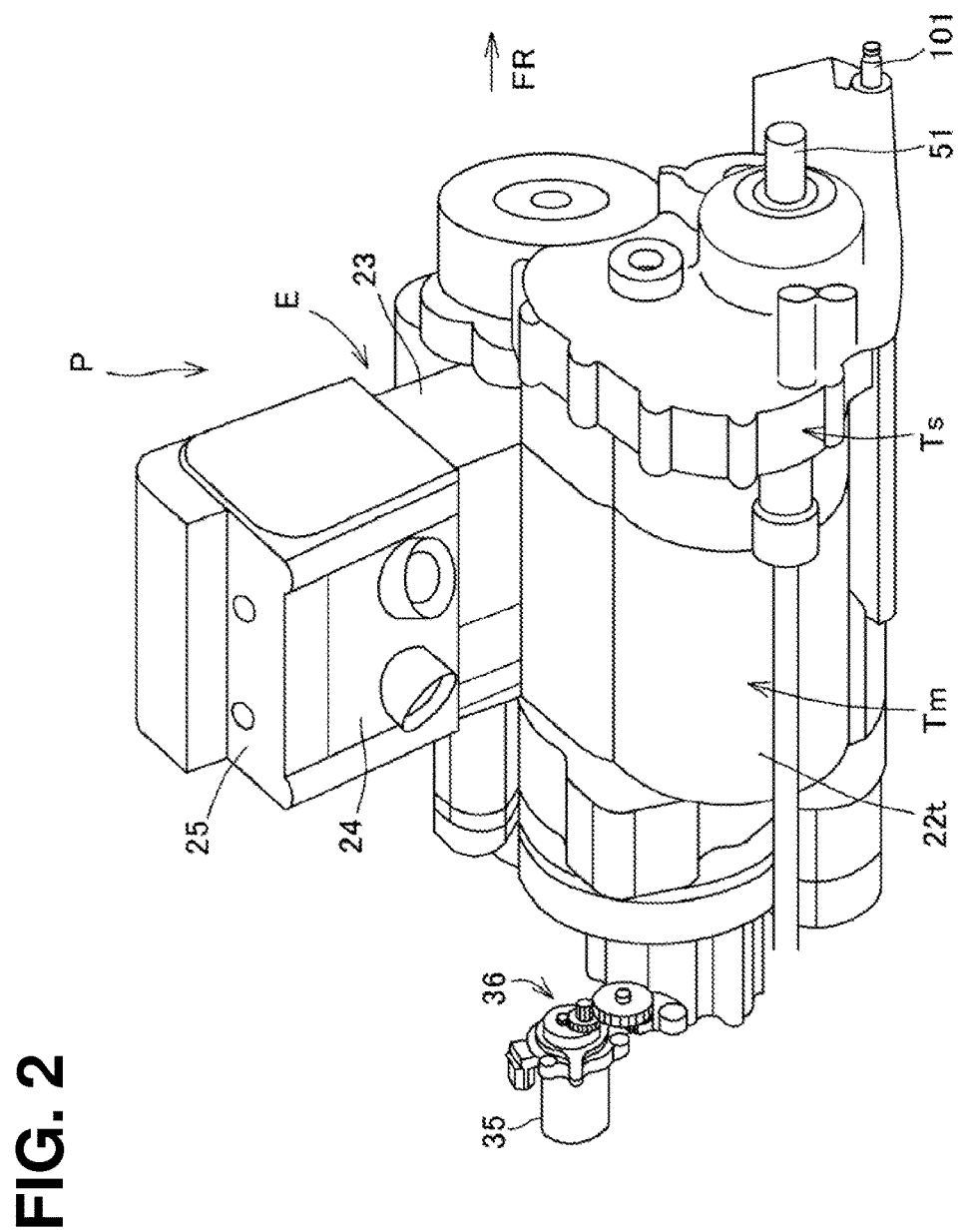
FIG. 2 is an overall perspective view of the power unit of FIG. 1.
Figure 3:
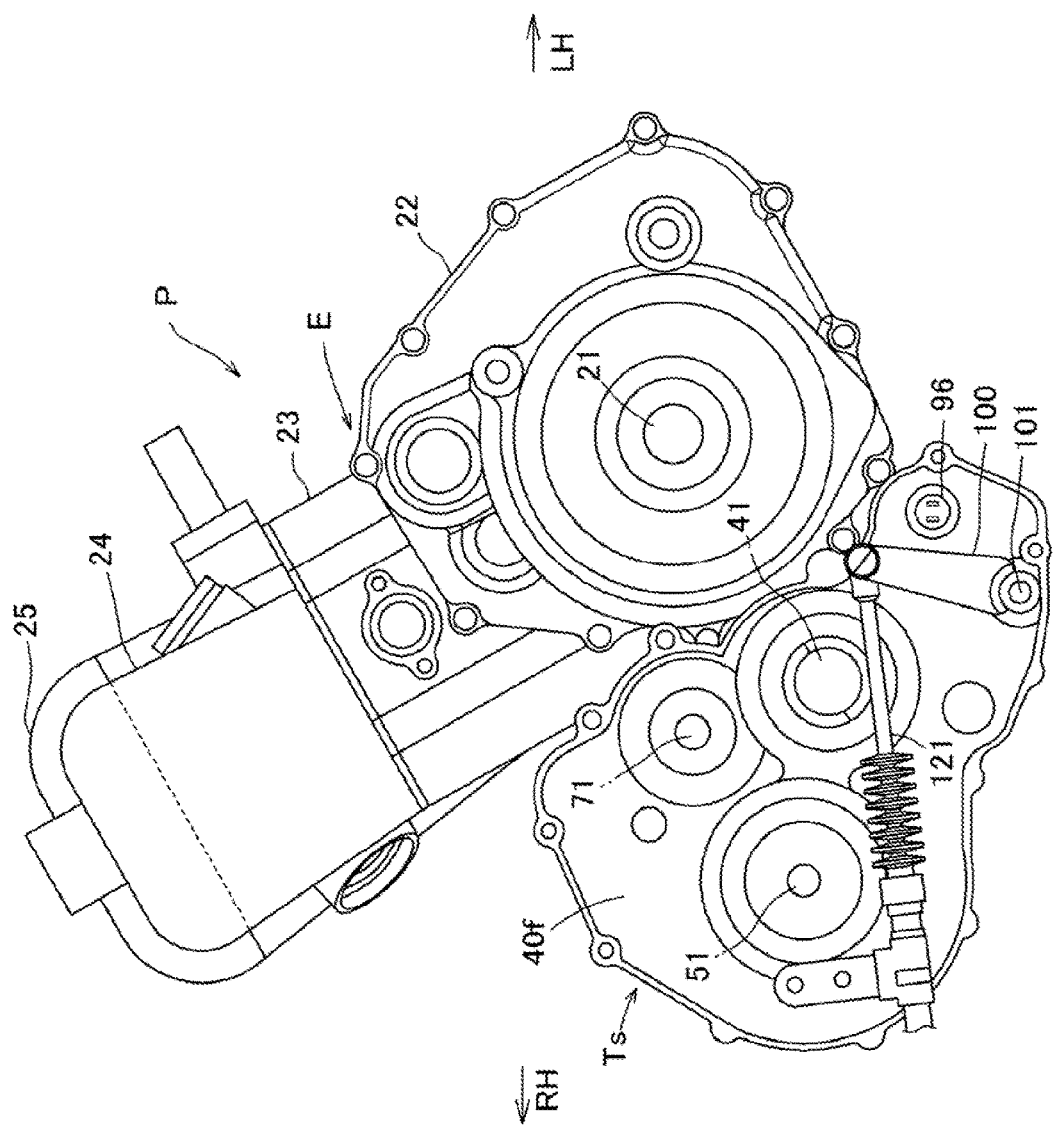
FIG. 3 is a front view of the power unit of FIG. 1.

Referring to FIGS. 2 and 3, in the power unit P, a cylinder block 23, a cylinder head 24, and a cylinder head cover 25 are sequentially overlapped to protrude obliquely toward the right upper side of a crankcase 22 that pivotally supports the crankshaft 21 of the internal combustion engine E. The crankcase 22 bulges to the right side and forms a main transmission case 22t to house the main transmission Tm. This main transmission Tm is located on the right side of the crankshaft 21 of the internal combustion engine E and the sub-transmission Ts is provided in a protruding manner to substantially overlap with the front side of the main transmission Tm.

Figure 5:
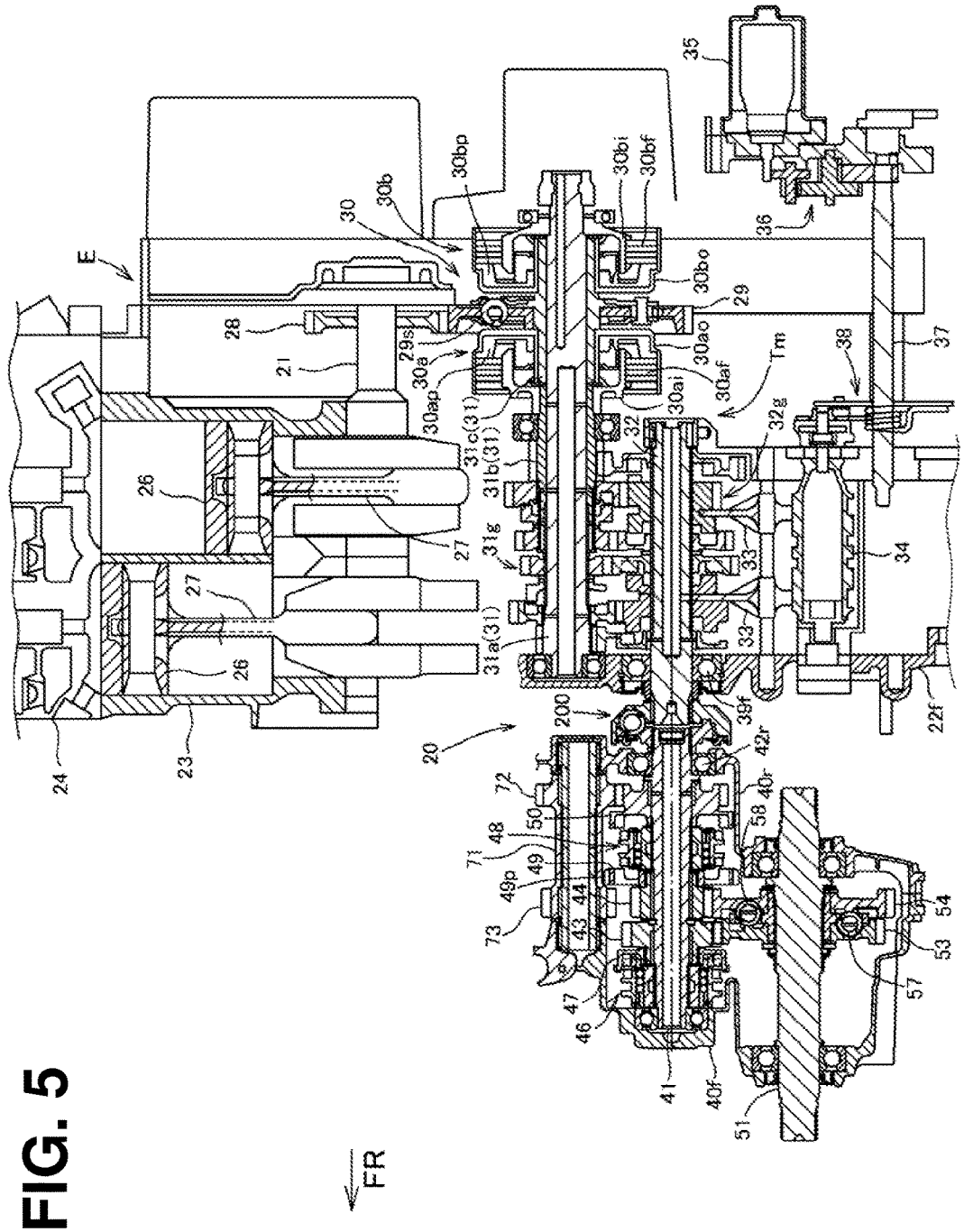
FIG. 5 is a sectional view of a powertrain system showing the whole of a powertrain of the power unit of FIG. 1.

The whole of the power train system 20 is shown in FIG. 5 as a sectional view.

In the cylinder block 23 of the internal combustion engine E, two cylinders are formed to be lined in the front-rear direction in a straight manner. Connecting rods 27 join pistons 26 that slide in a reciprocating manner in the respective cylinder bores to the crankshaft 21 and the reciprocation of the pistons 26 is converted to the rotation of the crankshaft 21 to be output. A primary drive gear 28 is fitted to the rear end part of the crankshaft 21 oriented along the front-rear direction.

A main shaft 31 of the main transmission Tm located on the right side of the crankshaft 21 is formed by rotatably fitting a main shaft outer cylinder 31b and a clutch part outer cylinder 31c lined in the front-rear direction to the outer circumference of a main shaft inner cylinder 31a as a long component. Six drive transmission gears 31g are provided on the main shaft 31. Corresponding to the drive transmission gears 31g, six driven transmission gears 32g that constantly mesh with them are provided on a countershaft 32. The drive transmission gears 31g of odd shift stages are provided on the main shaft inner cylinder 31a and the drive transmission gears 31g of even shift stages are provided on the main shaft outer cylinder 31b.

A twin clutch 30 composed of a first clutch 30a and a second clutch 30b is formed on the clutch part outer cylinder 31c. A primary driven gear 29 is splined to the center of the clutch part outer cylinder 31c and clutch outers 30ao and 30bo of the first clutch 30a and the second clutch 30b are splined to both sides of the primary driven gear 29 with restriction of movement in the axial direction.

The primary driven gear 29 at the center meshes with the primary drive gear 28 provided on the crankshaft 21. A clutch damper spring 29s is interposed between the primary driven gear 29 and a central flange part of the clutch part outer cylinder 31c and buffers torque fluctuation between the primary driven gear 29 and the clutch part outer cylinder 31c.

A clutch inner 30ai of the first clutch 30a is splined to the main shaft inner cylinder 31a with restriction of movement in the axial direction, and a clutch inner 30bi of the second clutch 30b is splined to the main shaft outer cylinder 31b with restriction of movement in the axial direction. A pressurizing plate 30ap (30bp) can pressurize a friction plate group 30af (30bf) in which drive friction plates that rotate together on the side of the clutch outer 30ao (30bo) and driven friction plates that rotate together on the side of the clutch inner 30ai (30bi) are alternately arranged.

A hydraulic circuit that selectively drives the pressurizing plates 30ap and 30bp is formed in the main shaft inner cylinder 31a, the clutch part outer cylinder 31c, and a rear crankcase cover. When the pressurizing plate 30ap is driven and the friction plate group 30af is pressurized, the first clutch 30a is connected and power input to the primary driven gear 29 is transmitted to the main shaft inner cylinder 31a, so that the drive transmission gears 31g of the odd shift stages rotate. On the other hand, when the pressurizing plate 30bp is driven and the friction plate group 30bf is pressurized, the second clutch 30b is connected and power input to the primary driven gear 29 is transmitted to the main shaft outer cylinder 31b, so that the drive transmission gears 31g of the even shift stages rotate.

Two of the six drive transmission gears 31g pivotally supported by the main shaft 31 are shifter gears that slide in the axial direction and two of the six driven transmission gears 32g pivotally supported by the countershaft 32 are shifter gears that slide in the axial direction. Shift forks 33 that move the two shifter gears on the countershaft 32 are provided to be supported by a shift fork shaft 33a. Shift forks 33 that move the two shifter gears on the main shaft 31 and a shift fork shaft for them are also provided although not shown in the diagram.

The four shift forks 33 move by being guided by guide grooves formed in the outer circumferential surface of a shift drum 34 through the rotation of the shift drum 34, and switch the meshing of the gears to which power is transmitted effectively. The shift drum 34 rotates by a gearshift motor 35. The driving force of the gearshift motor 35 is transmitted for the rotation of a shift spindle 37 via a reduction gear mechanism 36 and the rotation of the shift spindle 37 is transmitted for the rotation of the shift drum 34 via an intermittent feed mechanism 38.

Therefore, the main transmission Tm can smoothly make switching among shift stages from first to sixth and shift gears by hydraulic control of the twin clutch 30 and driving control of the gearshift motor 35. The output shaft of the main transmission Tm is the countershaft 32 and the countershaft 32 penetrates a front wall 22f of the crankcase 22 and protrudes forward.

Figure 4:
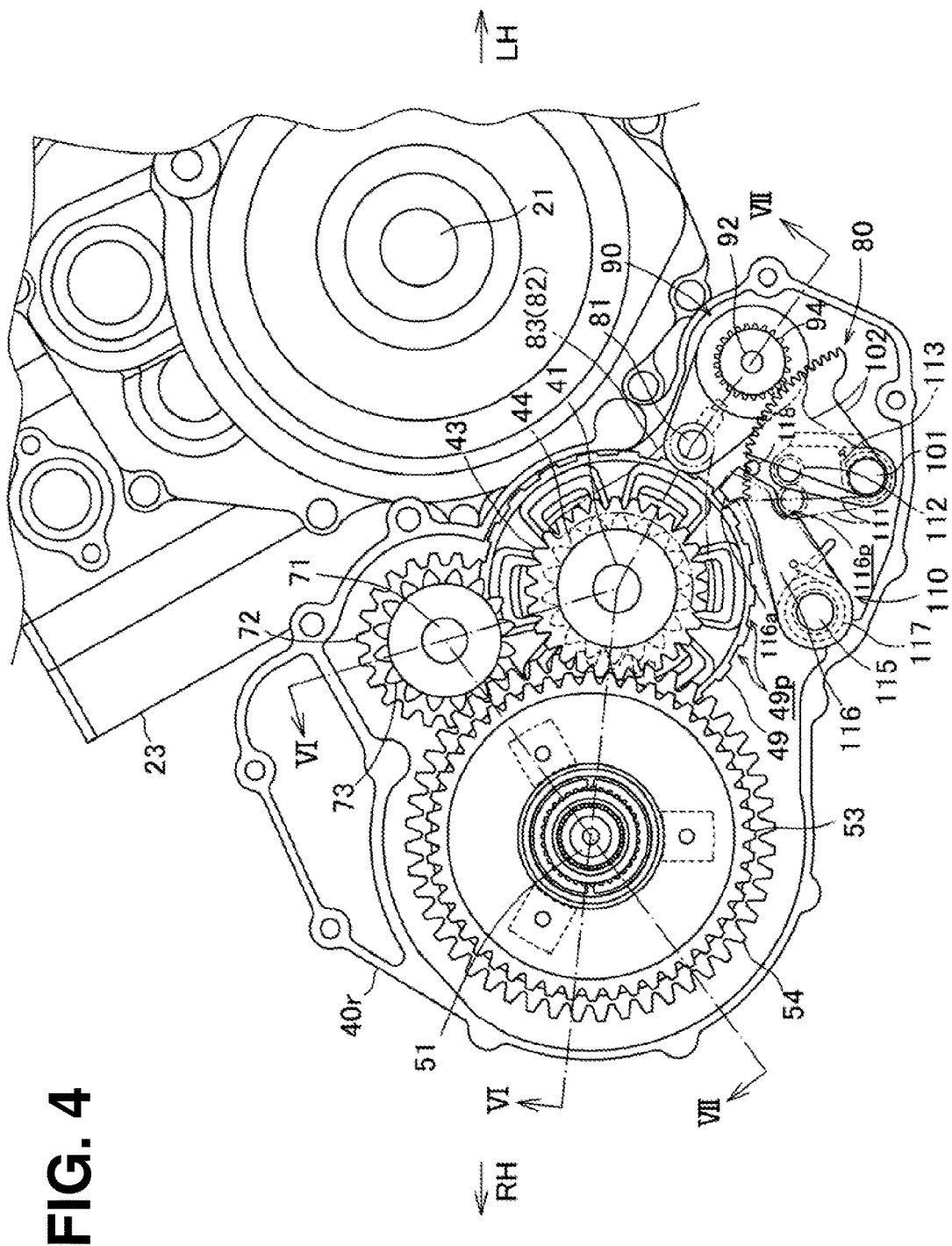
FIG. 4 is a front view of a sub-transmission of the power unit of FIG. 1 from which a front sub-transmission case is removed.

In the power unit P, the sub-transmission Ts is provided on the front side of this main transmission Tm. In the sub-transmission Ts, a front sub-transmission case 40f and a rear sub-transmission case 40r made as front-rear split components are united with each other and are constituted inside. As shown in FIG. 4, which is a front view of a state in which the front sub-transmission case 40f of the sub-transmission Ts is removed, a gearshift drive shaft 41 and the gearshift driven shaft 51 that mesh transmission gears with each other in the sub-transmission Ts are disposed to be lined in the left-right direction and an intermediate gear shaft 71 is disposed at a position corresponding to a corner of a triangle on the obliquely upper side of each of the gearshift drive shaft 41 and the gearshift driven shaft 51.

Figure 6:
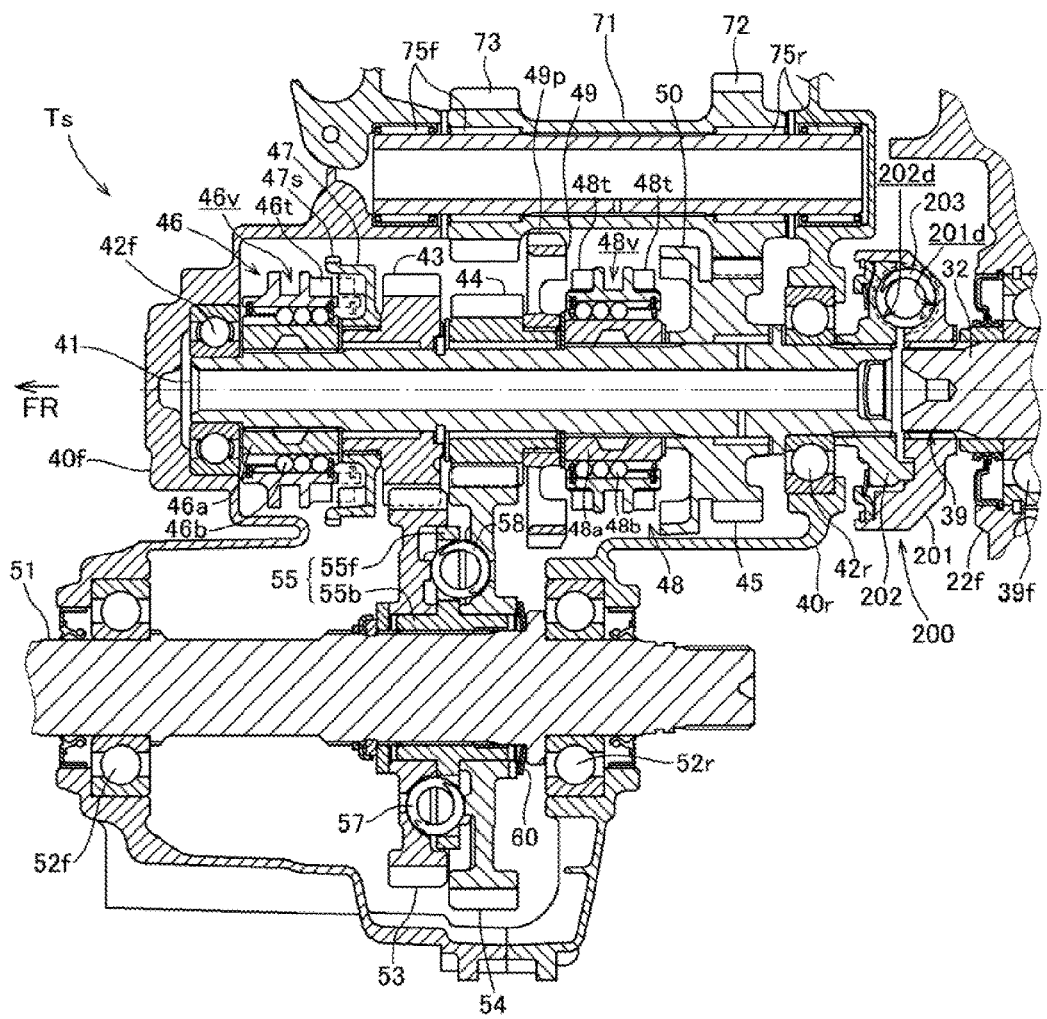
FIG. 6 is a sectional view of the sub-transmission (sectional view along line VI-VI in FIG. 4).
Figure 7:
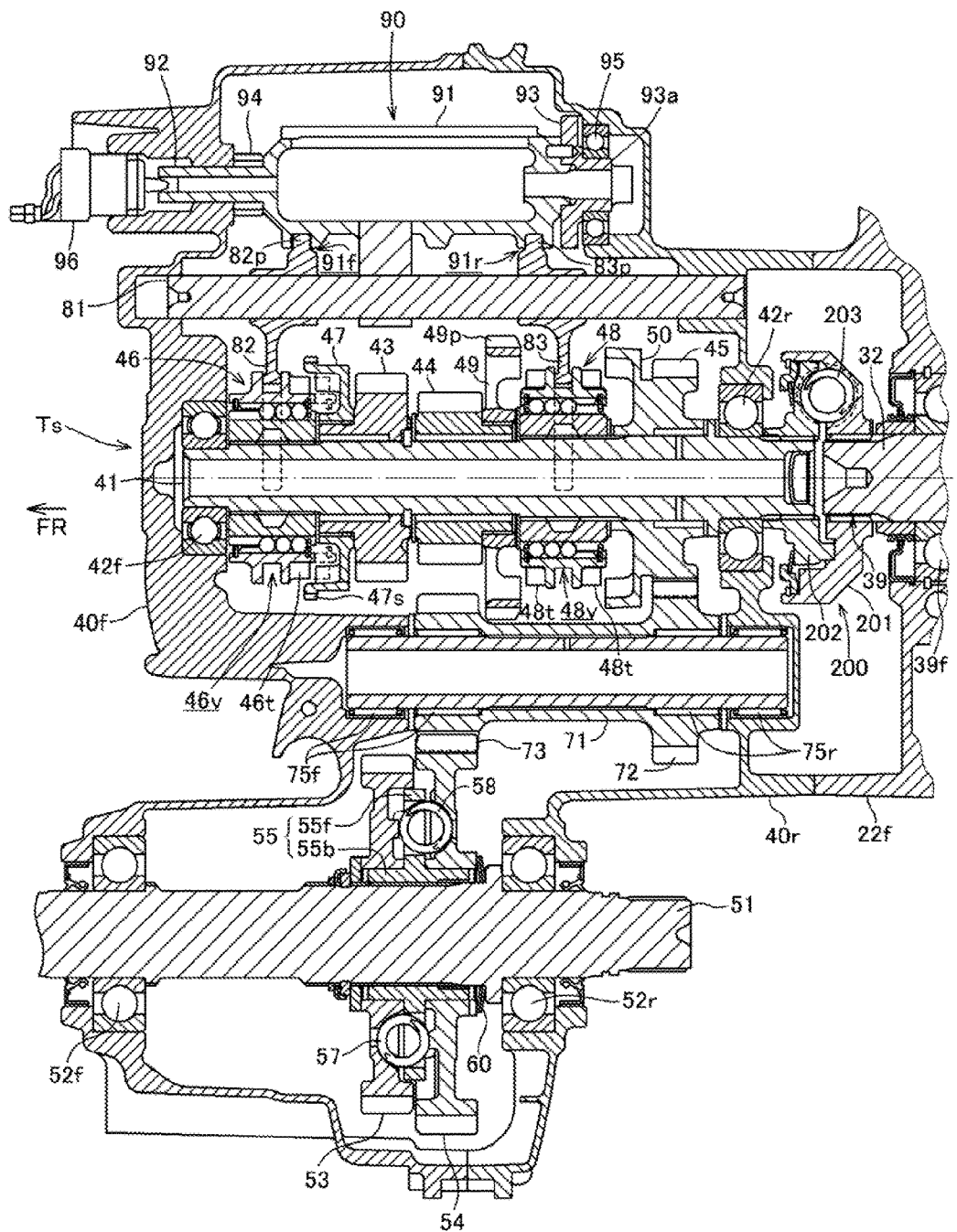
FIG. 7 is a sectional view of the sub-transmission (sectional view along line VII-VII in FIG. 4).

Referring to FIGS. 6 and 7 as sectional views of the sub-transmission Ts, the gearshift drive shaft 41, the gearshift driven shaft 51, and the intermediate gear shaft 71 of the sub-transmission Ts are oriented along the front-rear direction in parallel to the crankshaft 21, and are each suspended, with the front and rear ends pivotally supported by the front sub-transmission case 40f and the rear sub-transmission case 40r.

The gearshift drive shaft 41 is rotatably suspended, with the front end pivotally supported by a bearing 42f fitted into a bearing recess of the front sub-transmission case 40f and with the rear end pivotally supported by a bearing 42r fitted into a bearing hole of the rear sub-transmission case 40r. The gearshift drive shaft 41 penetrates the bearing 42r and protrudes rearward from the rear sub-transmission case 40r.

Meanwhile, the countershaft 32 that is pivotally supported by a bearing 39f and penetrates the front wall 22f of the crankcase 22 of the main transmission Tm forward to protrude forward is located on the rear side of the gearshift drive shaft 41 coaxially, with end surfaces opposed to each other. A joining torque damper 200 is interposed between the countershaft 32 and the gearshift drive shaft 41, which are coaxially disposed (see FIG. 5).

Referring to FIGS. 6 and 7, the joining torque damper 200 is formed as follows. A drive-side damper half body 201 splined to the front shaft end part of the countershaft 32 and a driven-side damper half body 202 splined to the rear shaft end part of the gearshift drive shaft 41 are disposed opposed to each other. Furthermore, a coil spring 203 is set to straddle both a drive-side spring recess 201d and a driven-side spring recess 202d that each have a semicircular column shape and are formed in the surfaces opposed to each other in the drive-side damper half body 201 and the driven-side damper half body 202, with their openings opposed to each other.

Therefore, the rotation of the countershaft 32, which is a drive shaft from the viewpoint of the joining torque damper 200, is transmitted to the gearshift drive shaft 41 as a driven shaft via the joining torque damper 200, and the coil spring 203 of the joining torque damper 200 buffers torque fluctuation between them. Details of the joining torque damper 200 will be described later.

Referring to FIGS. 6 and 7, on the gearshift drive shaft 41, a high-speed drive gear 43 and a low-speed drive gear 44 are lined in the front-rear direction and are rotatably supported at a center part and a reverse drive gear 45 is rotatably supported at a rear part. Furthermore, the gearshift drive shaft 41 is provided with a high-speed switching clutch mechanism based on a high-speed switching shifter member 46 between the bearing 42f at the front end and the high-speed drive gear 43. The high-speed switching shifter member 46 is supported movably in the axial direction by the outer circumference of a cylindrical base part 46a splined to a predetermined position on the gearshift drive shaft 41 in the axial direction with the intermediary of a linear-motion bearing 46b. A shift fork groove 46v is formed into a ring shape at the center of the high-speed switching shifter member 46 and a clutch tooth 46t is formed toward the rear side relative to the shift fork groove 46v.

A high-speed gearshift clutch receiving member 47 is provided to be opposed to this clutch tooth 46t and be fitted to the high-speed drive gear 43. Therefore, when the high-speed switching shifter member 46 moves rearward, the clutch tooth 46t meshes with the high-speed gearshift clutch receiving member 47 fitted to the high-speed drive gear 43 and rotates the high-speed drive gear 43 with the gearshift drive shaft 41. When the high-speed switching shifter member 46 exists on the front side, power is not transmitted to the high-speed drive gear 43. Plural protruding streaks 47s are formed at equal intervals on the outer circumferential surface of the high-speed gearshift clutch receiving member 47 and a speed sensor (not shown) senses the protruding streaks 47s to detect the vehicle speed.

On the other hand, on the gearshift drive shaft 41, a low-speed/reverse switching clutch mechanism based on a low-speed/reverse switching shifter member 48 is provided between the low-speed drive gear 44 and the reverse drive gear 45. The low-speed/reverse switching shifter member 48 is supported movably in the axial direction by the outer circumference of a cylindrical base part 48a splined to a predetermined position on the gearshift drive shaft 41 in the axial direction with the intermediary of a linear-motion bearing 48b. A shift fork groove 48v is formed between clutch teeth 48t formed toward both the front and rear sides.

A low-speed gearshift clutch receiving member 49 is provided to be opposed to the front clutch tooth 48t of the low-speed/reverse switching shifter member 48 and be fitted to the low-speed drive gear 44. A reverse clutch receiving member 50 is provided to be opposed to the rear clutch tooth 48t and be fitted to the reverse drive gear 45.

Therefore, when the low-speed/reverse switching shifter member 48 moves forward, the front clutch tooth 48t meshes with the low-speed gearshift clutch receiving member 49 fitted to the low-speed drive gear 44 and rotates the low-speed drive gear 44 with the gearshift drive shaft 41. When the low-speed/reverse switching shifter member 48 moves rearward, the rear clutch tooth 48t meshes with the reverse clutch receiving member 50 fitted to the reverse drive gear 45 and rotates the reverse drive gear 45 with the gearshift drive shaft 41.

When the low-speed/reverse switching shifter member 48 is located at a central position between the low-speed gearshift clutch receiving member 49 and the reverse clutch receiving member 50 and meshes with neither, the rotation of the gearshift drive shaft 41 is transmitted to neither the low-speed drive gear 44 nor the reverse drive gear 45. Plural locking grooves 49p for parking are formed in the circumferential direction in the outer circumferential surface of the low-speed gearshift clutch receiving member 49 and are used for parking stop.

In the gearshift driven shaft 51 disposed on the right side of the gearshift drive shaft 41 in parallel, the front part penetrates a bearing 52f fitted into a bearing hole of the front sub-transmission case 40f and is pivotally supported and the rear part penetrates a bearing 52r fitted into a bearing hole of the rear sub-transmission case 40r and is pivotally supported. Thus, the gearshift driven shaft 51 is rotatably suspended, with the front and rear ends protruded forward and rearward. The gearshift driven shaft 51, which is a powertrain shaft, is the output shaft 51 of the sub-transmission Ts and also the output shaft 51 of the power unit P.

On this gearshift driven shaft 51, a high-speed driven gear 53 and a low-speed driven gear 54 that constantly mesh with the high-speed drive gear 43 and the low-speed drive gear 44, respectively, pivotally supported by the gearshift drive shaft 41 are pivotally supported (see FIG. 6). A gear boss member 55 that is fitted to the gearshift driven shaft 51 and is prohibited from rotating relative to the gearshift driven shaft 51 pivotally supports the high-speed driven gear 53 and the low-speed driven gear 54, with each of these gears allowed to rotate relative to the gear boss member 55.

The gear boss member 55 is composed of a cylindrical boss part 55b that is fitted to the gearshift driven shaft 51 and is prohibited from rotating relative to the gearshift driven shaft 51 and a circular flange part 55f formed at the center of the cylindrical boss part 55b in the axial direction. The high-speed driven gear 53 and the low-speed driven gear 54 adjacent to each other are disposed at front and rear positions between which the circular flange part 55f of the gear boss member 55 is interposed, and are each pivotally supported by the cylindrical boss part 55b extending to the front and rear sides of the circular flange part 55f rotatably relative to the cylindrical boss part 55b. The high-speed driven gear 53 and the low-speed driven gear 54 are biased in the axial direction by a coned disc spring 60, with the gear boss member 55 interposed between them.

A high-speed-side coil spring is interposed between the high-speed driven gear 53 on the front side and the circular flange part 55f of the gear boss member 55, and a low-speed-side coil spring 58 is interposed between the low-speed driven gear 54 on the rear side and the circular flange part 55f of the gear boss member 55.

Therefore, the rotation of the high-speed driven gear 53 is transmitted to the gear boss member 55 and the gearshift driven shaft 51 via the high-speed-side coil spring 57, and the high-speed-side coil spring 57 buffers torque fluctuation between the high-speed driven gear 53 and the gear boss member 55. Similarly, the rotation of the low-speed driven gear 54 is transmitted to the gear boss member 55 and the gearshift driven shaft 51 via the low-speed-side coil spring 58, and the low-speed-side coil spring 58 buffers torque fluctuation between the low-speed driven gear 54 and the gear boss member 55.

Referring to FIG. 6, the intermediate gear shaft 71 located on the obliquely upper side of each of the gearshift drive shaft 41 and the gearshift driven shaft 51 is rotatably suspended, with the front end pivotally supported by a front-rear dual-type bearing 75f fitted into a bearing recess of the front sub-transmission case 40f and with the rear end pivotally supported by a front-rear dual-type bearing 75r fitted into a bearing recess of the rear sub-transmission case 40r (see FIGS. 6 and 7).

On the intermediate gear shaft 71, a larger-diameter intermediate gear 72 is formed at the rear part and a smaller-diameter intermediate gear 73 is formed at the front part. The larger-diameter intermediate gear 72 on the rear side meshes with the reverse drive gear 45 rotatably supported by the gearshift drive shaft 41 (see FIG. 6) and the smaller-diameter intermediate gear 73 on the front side meshes with the low-speed driven gear 54 rotatably supported by the gearshift driven shaft 51 (see FIG. 7).

A gearshift drive mechanism 80 that moves the high-speed switching shifter member 46 and the low-speed/reverse switching shifter member 48 on the gearshift drive shaft 41 in the axial direction is provided on the left side (right side, in FIG. 4) of the gearshift drive shaft 41, i.e. on the lower side of the crankshaft 21.

A shift fork shaft 81 penetrates a shift fork 82 fitted into the shift fork groove 46*v* of the high-speed switching shifter member 46 and a shift fork 83 fitted into the shift fork groove 48*v* of the low-speed/reverse switching shifter member 48, and pivotally supports the shift forks 82 and 83 slidably in the axial direction. The shift fork shaft 81 is suspended at a position on the obliquely left lower side of the gearshift drive shaft 41, with the front and rear ends supported by the front sub-transmission case 40*f* and the rear sub-transmission case 40*r* (see FIGS. 4 and 7).

A shift drum 90 is provided on the obliquely left lower side of the shift fork shaft 81 (see FIG. 4). Referring to FIG. 7, in the shift drum 90, a drum support shaft 92 protrudes toward the front side from the front end of a drum main body 91 having a cylindrical shape and penetrates the front sub-transmission case 40*f* to be rotatably supported. A star-shaped cam 93 is fastened to the rear end of the drum main body 91 and a center shaft 93*a* protruding to the rear side of the star-shaped cam 93 is pivotally supported by a bearing recess of the rear sub-transmission case 40*r* with the intermediary of a bearing 95.

A shift drum input gear 94 is fitted to the drum support shaft 92 protruding to the front side of the shift drum 90 along the inner surface of the front sub-transmission case 40*f*. The front end of the drum support shaft 92 penetrating the front sub-transmission case 40*f* and protruding is joined to a drive shaft of a shift position sensor 96 coaxially. The rotational angle of the shift drum 90 is detected by the shift position sensor 96.

In the outer circumferential surface of the drum main body 91, guide grooves 91*f* and 91*r* are formed along the circumferential direction at front and rear positions with requisite shapes. Engagement pin parts 82*p* and 83*p* formed to protrude in the shift forks 82 and 83 slidably engage with the guide grooves 91*f* and 91*r*. By the rotation of the shift drum 90, the shift forks 82 and 83 are guided by the guide grooves 91*f* and 91*r*, respectively, to move in the axial direction. This moves the high-speed switching shifter member 46 and the low-speed/reverse switching shifter member 48 to perform gearshift.

Referring to FIG. 4, the shift spindle 101 is suspended below the shift fork shaft 81, with the front and rear ends rotatably supported by the front sub-transmission case 40*f* and the rear sub-transmission case 40*r*. The base end of the shift actuation lever 100 is fitted to the front end of the shift spindle 101 penetrating the front sub-transmission case 40*f* and protruding forward (FIG. 3). A gear shift arm 102 having a sector form is fitted to the shift spindle 101 at a predetermined position and meshes with the shift drum input gear 94 fitted to the drum support shaft 92 protruding to the front side of the shift drum 90.

Furthermore, a parking actuation arm 111 is pivotally supported swingably on the shift spindle 101 on the rear side of the gear shift arm 102. A torsion spring 113 is interposed between the shift spindle 101 and the parking actuation arm 111 and the rotation of the shift spindle 101 is transmitted for the swing of the parking actuation arm 111 via the torsion spring 113. A roller 112 is rotatably supported at the tip of the parking actuation arm 111 (see FIG. 4).

Referring to FIG. 4, a lever support shaft 115 oriented along the front-rear direction is suspended on the right side of the shift spindle 101 and on the lower side of the gearshift drive shaft 41, with the front and rear ends supported by the front sub-transmission case 40*f* and the rear sub-transmission case 40*r*. A parking locking lever 116 whose base end is pivotally supported by the lever support shaft 115 is swingably provided.

Referring to FIG. 4, which is a front view, the parking locking lever 116 exists at the same position as the low-speed gearshift clutch receiving member 49 pivotally supported by the gearshift drive shaft 41 in the front-rear axial direction, and is provided to extend from the base end part pivotally supported by the lever support shaft 115 toward the obliquely upper side between the low-speed gearshift clutch receiving member 49 and the parking actuation arm 111. The plural locking grooves 49*p* for parking are formed in the circumferential direction in the outer circumferential surface of the low-speed gearshift clutch receiving member 49.

The parking locking lever 116 is biased in a clockwise direction in front view by a torsion spring 117 wound around the lever support shaft 115. The tip of the parking locking lever 116 is in contact with a stopper 118 provided to protrude from the rear sub-transmission case 40*r* at a predetermined position and thereby the swing of the parking locking lever 116 is restricted. In the parking locking lever 116, a locking protrusion 116*a* is formed to protrude in the side facing the outer circumferential surface of the low-speed gearshift clutch receiving member 49. Furthermore, in the side that is on the opposite side and faces the parking actuation arm 111, a concave surface 116*p* for parking is formed in an inclined surface with which the roller 112 at the tip of the parking actuation arm 111 gets contact (see FIG. 4).

A parking drive mechanism 110 is formed by the parking actuation arm 111, the parking locking lever 116, and the locking grooves 49*p* for parking in the low-speed gearshift clutch receiving member 49. FIG. 4 shows a state in which the sub-transmission Ts is in the neutral state. The parking locking lever 116 biased by the torsion spring 117 is in contact with the stopper 118 and is located separately from the outer circumferential surface of the low-speed gearshift clutch receiving member 49.

Referring to FIG. 4, when the shift spindle 101 rotates in an anticlockwise direction and the parking actuation arm 111 swings to the right side (left side, in FIG. 4) and the roller 112 at the tip of the parking actuation arm 111 abuts against the inclined surface of the parking locking lever 116 and rolls, the parking locking lever 116 is swung obliquely upward and the locking protrusion 116*a* of the parking locking lever 116 is pressed against the outer circumferential surface of the low-speed gearshift clutch receiving member 49 to engage with the locking grooves 49*p* for parking. This causes the parking locking lever 116 to restrict the rotation of the low-speed gearshift clutch receiving member 49. A state shown by a two-dot chain line in FIG. 4 shows this parking state in which the rotation of the low-speed gearshift clutch receiving member 49 is prohibited.

Specifically, referring to FIG. 6, when the rotation of the low-speed gearshift clutch receiving member 49 is restricted, the rotation of both the low-speed gearshift clutch receiving member 49 and the low-speed drive gear 44 integrated with it is restricted and the rotation of the low-speed driven gear 54, which meshes with the low-speed drive gear 44, is restricted. Thus, the rotation of the gearshift driven shaft (output shaft) 51, which moves in association with the low-speed driven gear 54 with the intermediary of the coil spring 58, is restricted, so that the vehicle enters the parking state. Because the rotation of the gearshift driven shaft (output shaft) 51 is restricted through the meshing between the low-speed drive gear 44 and the low-speed driven gear 54 having a high change gear ratio, the rotation of the gearshift driven shaft (output shaft) 51 can be restricted by a comparatively-large force at the time of parking.

Meanwhile, the rotation of the shift spindle 101 causes the pivot of the gear shift arm 102 fitted to the shift spindle 101, which rotates the shift drum input gear 94 meshing with the gear shift arm 102 together with the shift drum 90. This causes the shift forks 82 and 83 to be guided by the guide grooves 91f and 91r, respectively, of the shift drum 90. Thus, the high-speed switching shifter member 46 and the low-speed/reverse switching shifter member 48 move and the shift stage is switched. The above-described parking state is set by the rotation of this shift spindle 101.

The shift actuation lever 100 fitted to the front end of the shift spindle 101 protruding forward is joined to the shift cable 121 extending from the parking operation lever 120 disposed in the operation panel 130 as described above, and the shift spindle 101 rotates through operation of the parking operation lever 120. Therefore, the setting of the parking state and the switching of the shift stage are carried out through the operation of the parking operation lever 120.

When the parking operation lever 120 enters the parking position, the sub-transmission Ts becomes the parking state and the rotation of the rear drive shaft 8 is restricted. Simultaneously, the differential lock mechanism added to the rear differential 9 operates to become the differential lock state, so that the differential is stopped. Thus, the left and right rear wheels 3 are fixed and a sure parking brake state is obtained.

The parking state by the parking operation lever 120 is described above. Gearshift operation other than the parking will be described below. FIGS. 4 and 7 show the state in which the shift stage is in the neutral state.

When the parking operation lever 120 is swung forward by one stage to be set to the reverse position, the shift spindle 101 rotates and the gear shift arm 102 swings to the right side, so that the shift drum 90 rotates through meshing between the gear shift arm 102 and the shift drum input gear 94. Referring to FIG. 7, this causes the low-speed/reverse switching shifter member 48 to move rearward and engage with the reverse clutch receiving member 50. Thus, the rotation of the gearshift drive shaft 41 is transmitted to the intermediate gear shaft 71 through meshing between the reverse drive gear 45 and the larger-diameter intermediate gear 72, and the rotation of the intermediate gear shaft 71 is transmitted to the gearshift driven shaft (output shaft) 51 through meshing between the smaller-diameter intermediate gear 73 and the low-speed driven gear 54. Thus, the rotation of the gearshift drive shaft 41 makes the rearward-traveling rotation of the gearshift driven shaft (output shaft) 51 due to the intermediary of the intermediate gear shaft 71, providing the reverse state.

When the parking operation lever 120 is swung further forward from this reverse state, the above-described parking state is obtained. On the other hand, when the parking operation lever 120 is swung rearward by one stage from the neutral state to be set to the high-speed advancement position, the shift cable 121 makes a push action and the shift spindle 101 rotates. Therefore, the gear shift arm 102 swings to the left side and the shift drum 90 rotates through meshing between the gear shift arm 102 and the shift drum input gear 94. Referring to FIG. 6, this causes the high-speed switching shifter member 46 to move rearward and engage with the high-speed gearshift clutch receiving member 47. Thus, the rotation of the gearshift drive shaft 41 is transmitted to the gearshift driven shaft (output shaft) 51 through meshing between the high-speed drive gear 43 and the high-speed driven gear 53, providing the high-speed advancement state.

When the parking operation lever 120 is swung further rearward from this high-speed advancement state to be set to the low-speed advancement state, the shift cable 121 further makes a push action and thereby the shift drum 90 further rotates. Referring to FIG. 6, this moves the high-speed switching shifter member 46 forward to release the engagement with the high-speed gearshift clutch receiving member 47, and causes the low-speed/reverse switching shifter member 48 to move forward and engage with the low-speed gearshift clutch receiving member 49. Thus, the rotation of the gearshift drive shaft 41 is transmitted to the gearshift driven shaft (output shaft) 51 through meshing between the low-speed drive gear 44 and the low-speed driven gear 54, providing the low-speed advancement state. The low-speed driven gear 54 is used for low-speed advancement and is also used for reverse traveling as described above. That is, the low-speed driven gear 54 is a transmission gear used for both forward and reverse traveling and the gearshift driven shaft 51 is also an output shaft used for both forward and reverse traveling.

In the sub-transmission Ts, the above-described shift stage switching is carried out through manual operation of the parking operation lever 120. In the high-speed advancement state, the vehicle is driven by two-wheel driving. In the low-speed advancement state and the reverse state, the vehicle is driven by four-wheel driving.

A detailed description will be made below on the basis of FIGS. 8 to 11 about the joining torque damper 200 interposed between the countershaft 32 protruding forward from the front wall 22f of the crankcase 22 of the main transmission Tm and the gearshift drive shaft 41 protruding rearward from the rear sub-transmission case 40r of the sub-transmission Ts. When the joining torque damper 200 is regarded as the basis, the countershaft 32 is a drive shaft and the gearshift drive shaft 41 is a driven shaft.

Figure 8:
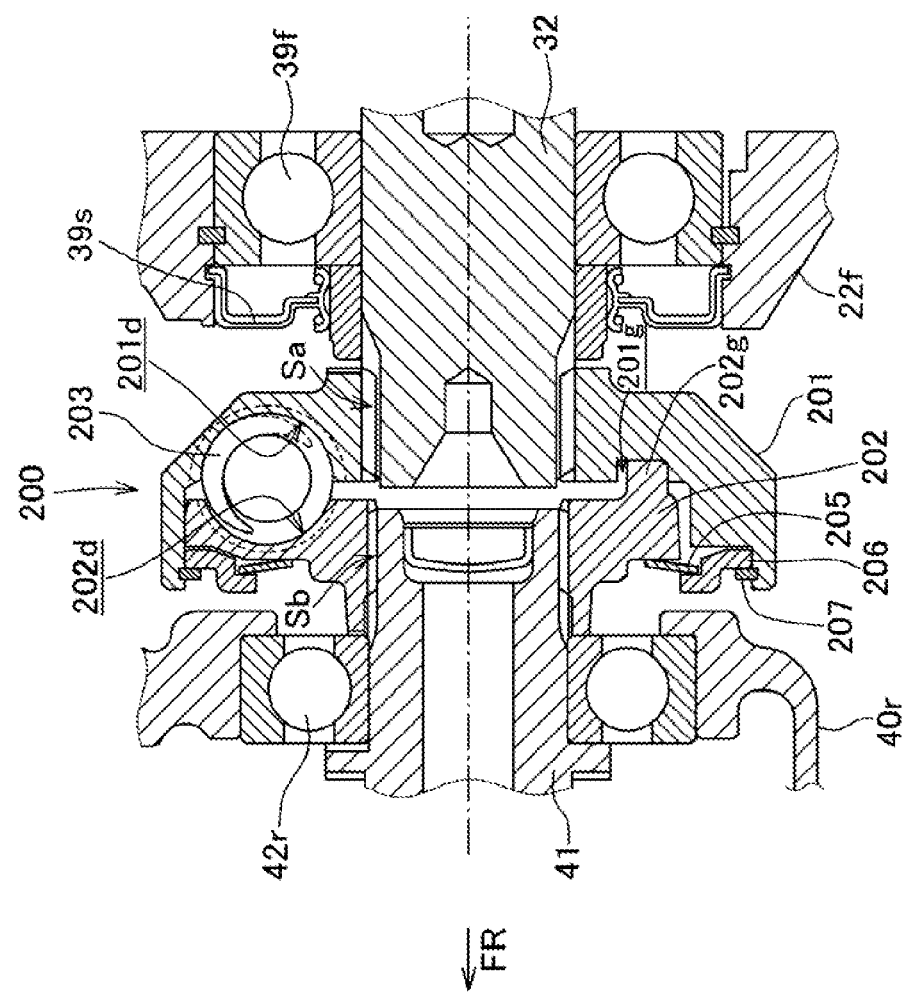
FIG. 8 is an enlarged sectional view of a joining torque damper (sectional view along line VIII-VIII in each of FIGS. 10, 11).
Figure 9:
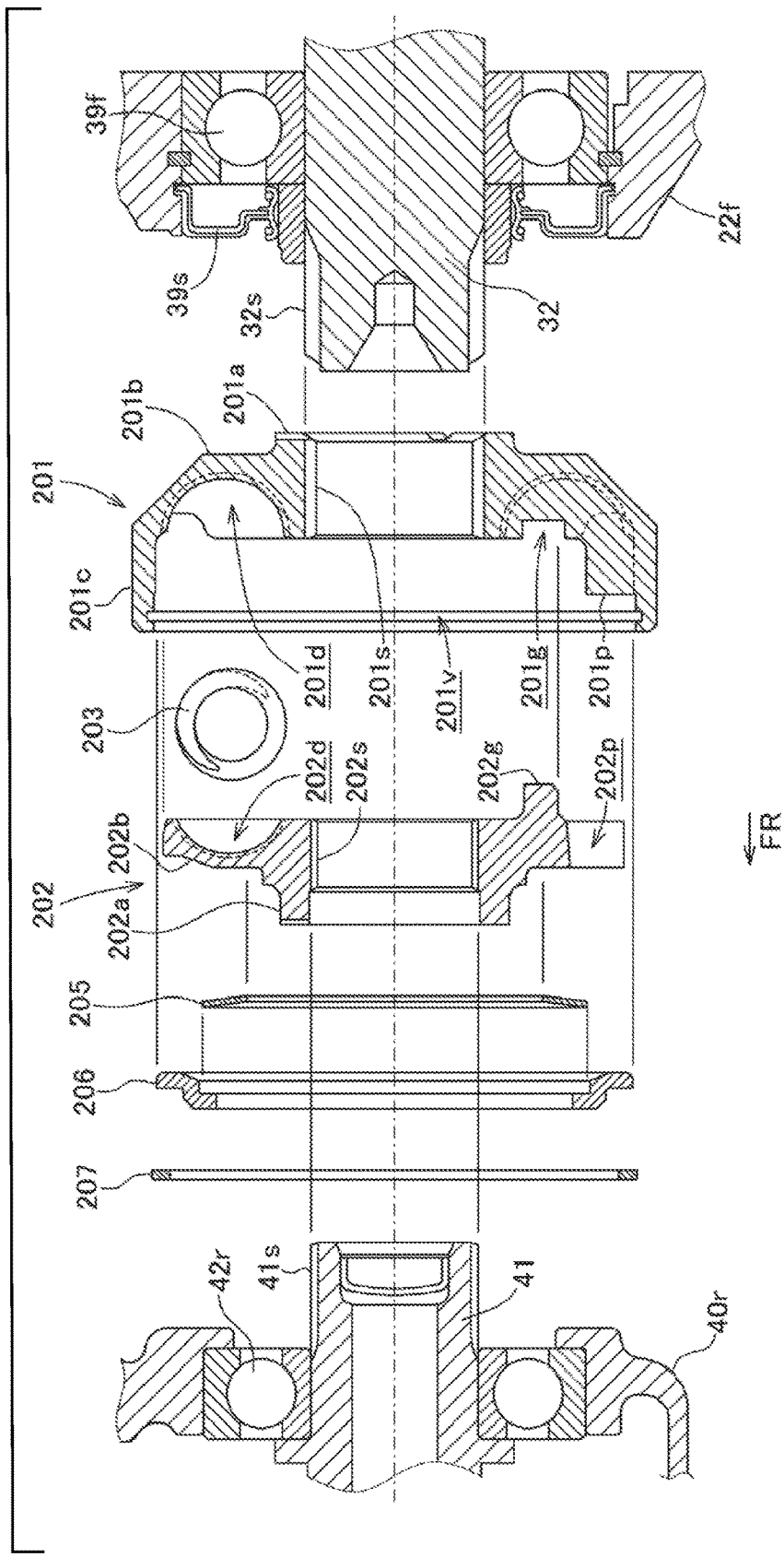
FIG. 9 is an exploded sectional view of the joining torque damper.

FIG. 8 is a sectional view showing a state in which the joining torque damper 200 is assembled between the countershaft 32 as the drive shaft and the gearshift drive shaft 41 as the driven shaft, and a sectional view of the joining torque damper 200 in the disassembled state is shown in FIG. 9. FIG. 9 shows a state before the sub-transmission Ts is assembled to the main transmission Tm. In FIG. 9, the countershaft 32 and the gearshift drive shaft 41 are shown at positions greatly separate from each other on the same axis.

The countershaft 32 is pivotally supported by a bearing hole of the front wall 22f of the crankcase 22 with the intermediary of the bearing 39f and a sealing member 39s is fitted into the opening of the bearing hole outside the bearing 39f. A spline 32s is formed at the front shaft end part that penetrates through the sealing member 39s and protrudes forward from the front wall 22f of the crankcase 22 in the countershaft 32 as the drive shaft. On the other hand, a spline 41s is formed at the rear shaft end part that penetrates through the bearing 42r and protrudes rearward from the rear sub-transmission case 40r in the gearshift drive shaft 41 as the driven shaft. The groove depth of the spline 41s of the gearshift drive shaft 41 is shallow whereas the groove depth of the spline 32s of the countershaft 32 is deep.

Figure 10:
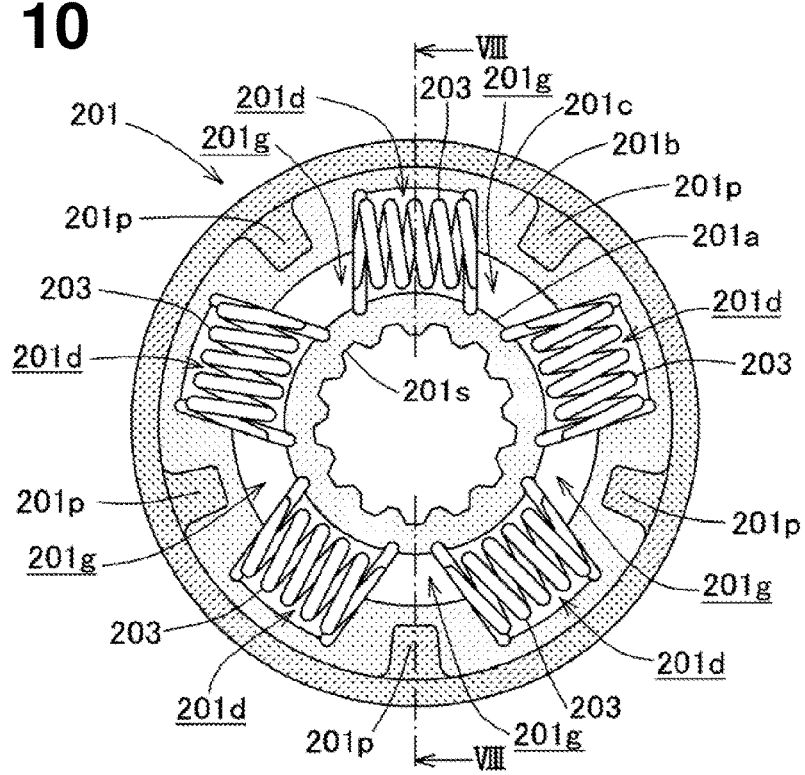
FIG. 10 is a front view of a drive-side damper half body into which coil springs are assembled.

Referring to FIGS. 9 and 10, in the drive-side damper half body 201 which constitutes one half body of the joining torque damper 200, an inner circumferential boss part 201a is formed at the inner circumferential rim of a hollow circular wall part 201b and an outer circumferential cylindrical part 201c is formed to extend forward at the outer circumferential rim of the hollow circular wall part 201b. Thus, the drive-side damper half body 201 has a substantially bowl shape. In the inner circumferential surface of the inner circumferential boss part 201a of the drive-side damper half body 201, a spline 201s that is fitted to the spline 32s of the front shaft end part of the countershaft 32 and has a deep groove is formed.

In the hollow circular wall part 201b of the drive-side damper half body 201, five spring recesses 201d that each hold one of the coil springs 203 are formed at equal intervals in the circumferential direction of the circular wall part. The spring recess 201d is a recess formed to dent into a semicircular column shape in the front surface of the hollow circular wall part 201b, and is opened into a rectangular shape toward the front side. Furthermore, in the front surface of the hollow circular wall part 201b, axis alignment recesses 201g each having a circular arc shape with a predetermined outer diameter are each formed between the adjacent ones of the spring recesses 201d.

On the outer circumferential cylindrical part 201c of the drive-side damper half body 201, five relative rotation restricting projections 201p protruding in a direction parallel to and towards a central axis of the circumferential cylindrical part 201c are formed at equal intervals in the circumferential direction. In front view of the drive-side damper half body 201 shown in FIG. 10, the relative rotation restricting projections 201p each protrude between adjacent ones of the spring recesses 201d. In the inner circumferential surface of the outer circumferential cylindrical part 201c of the drive-side damper half body 201, an inner circumferential groove 201v is formed at the front opening end.

Figure 11:
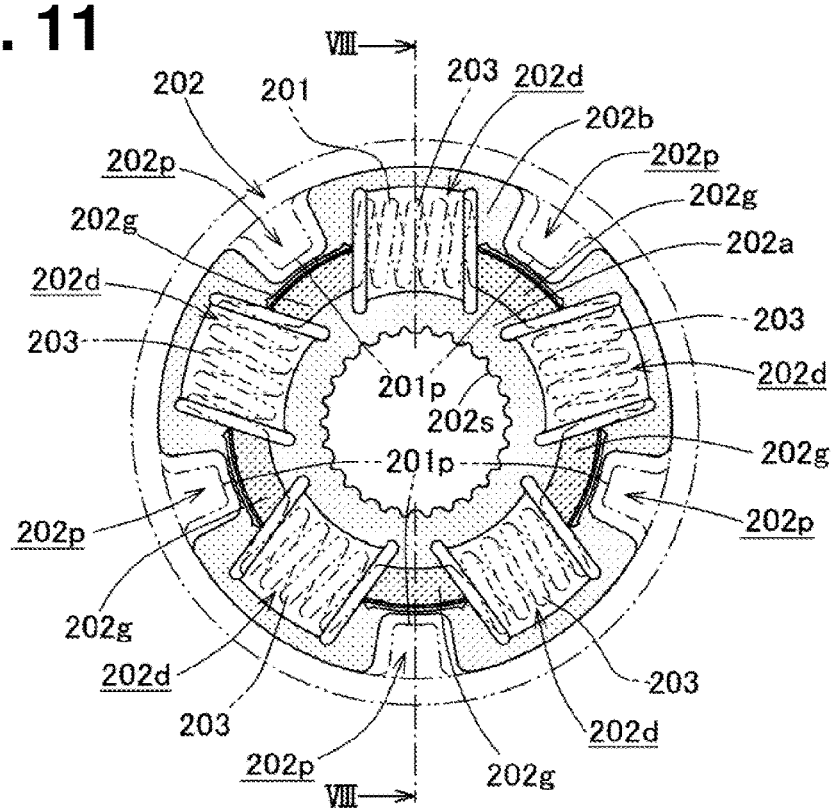
FIG. 11 is a rear view of a driven-side damper half body.

Referring to FIGS. 9 and 11, in the driven-side damper half body 202 which constitutes the other half body of the joining torque damper 200, an inner circumferential boss part 202a is formed to extend forward at the inner circumferential rim of a hollow circular wall part 202b opposed to the hollow circular wall part 201b of the drive-side damper half body 201. The outer diameter of the hollow circular wall part 202b is slightly smaller than the inner diameter of the outer circumferential cylindrical part 201c of the drive-side damper half body 201. In the inner circumferential surface of the inner circumferential boss part 202a of the driven-side damper half body 202, a spline 202s is formed that is fitted to the spline 41s of the rear shaft end part of the gearshift drive shaft 41 and has a shallow groove depth.

In the hollow circular wall part 202b of the driven-side damper half body 202, five driven-side spring recesses 202d that each hold one of the coil springs 203 are formed at equal intervals in the circumferential direction of the hollow circular wall part. Each of the driven-side spring recesses 202d is a recess formed to dent into a semicircular column shape in the front surface of the hollow circular wall part 202b, and is opened into a rectangular shape toward the rear side and opposed to the drive-side spring recess 201d of the drive-side damper half body 201. Furthermore, in the front surface of the hollow circular wall part 202b, corresponding to the axis alignment recesses 201g of the drive-side damper half body 201, axis alignment projections 202g are formed between adjacent ones of the driven-side spring recesses 202d, and each has a circular arc shape with the same outer diameter as that of the axis alignment recesses 201g.

Moreover, in the outer circumferential rim of the hollow circular wall part 202b, five relative rotation restricting recesses 202p are formed by notching at equal intervals in the circumferential direction such that each of the recesses 202p is disposed between two adjacent ones of the driven-side spring recesses 202d (see FIG. 11). The relative rotation restricting recess 202p of the hollow circular wall part 202b of the driven-side damper half body 202 are disposed in alignment with the relative rotation restricting projection 201p of the outer circumferential cylindrical part 201c of the drive-side damper half body 201.

Referring to FIG. 8, the drive-side damper half body 201 and the driven-side damper half body 202 are set coaxial with each other and are brought close to each other, with the coil springs 203 each interposed between one of the drive-side spring recess 201d and one of the driven-side spring recess 202d opposed to each other. Then, the axis alignment recesses 201g and the axis alignment projections 202g each having a circular arc shape are fitted to each other relatively rotatably and the drive-side damper half body 201 and the driven-side damper half body 202 are mated with each other, with the center axes thereof aligned to be coaxial.

The driven-side damper half body 202 enters the inside of the outer circumferential cylindrical part 201c of the drive-side damper half body 201 having a substantially bowl shape. Therefore, a coned disc spring 205 is made to abut against the back surface (front surface) of the hollow circular wall part 202b of the driven-side damper half body 202. Furthermore, a circular-ring-shaped spring receiving member 206 that has an outer diameter equal to that of the hollow circular wall part 202b and has a middle-diameter step part holds the coned disc spring 205 and presses it from the front surface. The forward movement of the spring receiving member 206 is restricted by a retaining ring 207 engaged with the inner circumferential groove 201v formed at the front opening end of the outer circumferential cylindrical part 201c of the drive-side damper half body 201. This causes the spring receiving member 206 to press the coned disc spring 205 from the front side. Thus, the coned disc spring 205 presses the driven-side damper half body 202 against the drive-side damper half body 201.

Therefore, the drive-side damper half body 201 holds the driven-side damper half body 202 in the outer circumferential cylindrical part 201c and is joined to the driven-side damper half body 202, with its outer circumferential end engaged with it by the spring receiving member 206 and the retaining ring 207 with the intermediary of the coned disc spring 205. Therefore, the joining torque damper 200 can be set to a sub-assembled state (see FIG. 8). The driven-side damper half body 202 is pressed against the drive-side damper half body 201 by the coned disc spring 205, with the axis alignment projections 202g made to abut and be pressed against the bottom surfaces of the axis alignment recesses 201g. However, the degree of this pressing is such that rotation relative to each other is possible.

When the sub-transmission Ts is assembled to the main transmission Tm, the sub-assembled joining torque damper 200 is attached to the countershaft 32 of the main transmission Tm and the gearshift drive shaft 41 of the sub-transmission Ts by being splined to each of them as shown in FIG. 8.

Specifically, the spline 41s of the rear shaft end part of the gearshift drive shaft 41 protruding rearward from the rear sub-transmission case 40r of the sub-transmission Ts is splined to the spline 202s of the driven-side damper half body 202 of the sub-assembled joining torque damper 200. Furthermore, the spline 32s of the front shaft end part of the countershaft 32 protruding forward from the front wall 22f of the crankcase 22 of the main transmission Tm is splined to the spline 201s of the drive-side damper half body 201 as the other half body of the joining torque damper 200.

In a drive-side splining part Sa at which the countershaft 32 is fitted to the drive-side damper half body 201, the groove depth of the spline is deep and the clearance in the radial direction is large. In a driven-side splining part Sb at which the gearshift drive shaft 41 is fitted to the driven-side damper half body 202, the groove depth of the spline is shallow and the clearance in the radial direction is small.

As described above, power is transmitted from the countershaft 32 of the main transmission Tm to the gearshift drive shaft 41 of the sub-transmission Ts via the joining torque damper 200. Thus, torque fluctuation itself accompanying the driving reaction force and gearshift can be suppressed to small fluctuation and the vibration of the power unit P can be easily reduced.

The drive-side damper half body 201 holds the driven-side damper half body 202 in the outer circumferential cylindrical part 201c and is joined to the driven-side damper half body 202, with its outer circumferential end engaged with it by the spring receiving member 206 and the retaining ring 207 with the intermediary of the coned disc spring 205. Furthermore, the coned disc spring 205 presses the driven-side damper half body 202 against the drive-side damper half body 201. Thus, the coned disc spring 205 functions as a torque damper with a certain level of frictional resistance at the time of initial rotation accompanying torque fluctuation. This can complement the initial vibration isolation effect of the coil springs 203 of the joining torque damper 200.

The sub-transmission cases 40f and 40r of the sub-transmission Ts are fastened to the crankcase 22 of the main transmission Tm and are fixed to each other. However, when misalignment is caused between them due to some sort of external force, misalignment is caused between the countershaft 32 and the gearshift drive shaft 41 coaxially joined to each other by the joining torque damper 200. However, the clearance in the radial direction in the drive-side splining part Sa between the drive-side damper half body 201 of the joining torque damper 200 and the countershaft 32 is large and there is room to allow the countershaft 32 and the drive-side damper half body 201 to move relative to each other in the radial direction. Therefore, even when some misalignment or distortion is caused in the center axes of the countershaft 32 and the gearshift drive shaft 41, stress other than rotational torque via the torque damper is absorbed and smooth power transmission can be maintained.

In the driven-side splining part Sb, in which there is negligible (almost no, or smaller) clearance in the radial direction, the groove depth of the spline is shallow. On the other hand, in the drive-side splining part Sa, in which the clearance in the radial direction is appreciable/large/larger and there is room to allow the countershaft 32 and the drive-side damper half body 201 to move relative to each other in the radial direction, the groove depth of the spline is deep and therefore the splining can be easily kept even when comparatively-large relative movement is made.

In the surfaces opposed to each other in the drive-side damper half body 201 and the driven-side damper half body 202, the axis alignment recesses 201g and the axis alignment projections 202g are formed opposed to each other in such a manner as to be allowed to be in contact with each other slidably in the relative rotation direction. Furthermore, such axis alignment recesses 201g and axis alignment projections 202g are fitted to each other. This causes the drive-side damper half body 201 and the driven-side damper half body 202 to hold each other relatively rotatably, with the rotation center axes thereof aligned to be coaxial with each other. Thus, even when positional misalignment due to distortion or the like is caused in the countershaft 32, which has room to move relative to the drive-side damper half body 201 in the radial direction, the drive-side damper half body 201 involves no backlash, which can prevent the drive-side damper half body 201 from abutting against the countershaft 32 to make noise.

The plural coil springs 203 are interposed at equal intervals in the circumferential direction in such a manner as to straddle the drive-side damper half body 201 and the driven-side damper half body 202, and the axis alignment recesses 201g and the axis alignment projections 202g are each formed between the coil springs 203 disposed adjacent to each other in the circumferential direction. Therefore, the axis alignment recesses 201g and the axis alignment projections 202g can be formed without enlarging the drive-side damper half body 201 and the driven-side damper half body 202 in the radial direction and size reduction of the joining torque damper 200 can be achieved.

In the surfaces opposed to each other in the drive-side damper half body 201 and the driven-side damper half body 202, the relative rotation restricting projections 201p and the relative rotation restricting recesses 202p are formed opposed to each other. Furthermore, the relative rotation restricting projections 201p and the relative rotation restricting recesses 202p are loosely fitted to each other. Due to this, the relative rotation of the drive-side damper half body 201 and the driven-side damper half body 202 is restricted to a predetermined range. Thus, by the simple structure, the relative rotation can be restricted to a range in which the damper function of the coil springs 203 sufficiently works.

The relative rotation restricting projections 201p and the relative rotation restricting recesses 202p are each formed at such a position as not to interfere with the axis alignment recesses 201g and the axis alignment projections 202g between the coil springs 203 interposed adjacent to each other in the circumferential direction. Therefore, the relative rotation restricting projections 201p and the relative rotation restricting recesses 202p can be formed without enlarging the drive-side damper half body 201 and the driven-side damper half body 202 in the radial direction and size reduction of the joining torque damper 200 can be achieved.

The countershaft 32 as a drive shaft and the gearshift drive shaft 41 as a driven shaft are rotatably supported by the crankcase 22 as a drive-side support case and the sub-transmission cases 40f and 40r as driven-side support cases, respectively, and the drive-side damper half body 201 and the driven-side damper half body 202 are each fitted to a respective one of the shaft end parts protruding to the outside of the cases. Therefore, even when the crankcase 22 and the sub-transmission cases 40f and 40r are somewhat relatively displaced and some misalignment or distortion is caused in the center axes of the countershaft 32 and the gearshift drive shaft 41, stress other than rotational torque via the joining torque damper 200 is absorbed and smooth power transmission can be kept.

The powertrain structure of one embodiment according to the present invention is described above. However, modes of the present invention are not limited to the above embodiment and include embodiments carried out with a variety of modes within the scope of the gist of the present invention.

DESCRIPTION OF REFERENCE SYMBOLS

P . . . Power unit, E . . . Internal combustion engine, Tm . . . Main transmission, Ts . . . Sub-transmission, 1 . . . Rough-terrain vehicle, 22 . . . Crankcase, 31 . . . Main shaft, 32 . . . Countershaft,
40f . . . Front sub-transmission case, 40r . . . Rear sub-transmission case, 41 . . . Gearshift drive shaft, 43 . . . High-speed drive gear, 44 . . . Low-speed drive gear, 45 . . . Reverse drive gear, 51 . . . Gearshift driven shaft (output shaft), 53 . . . High-speed driven gear, 54 . . . Low-speed driven gear, 55 . . . Gear boss member, 57 . . . High-speed-side coil spring, 58 . . . Low-speed-side coil spring,
Sa . . . Drive-side splining part, Sb . . . Driven-side splining part,
200 . . . Joining torque damper,
201 . . . Drive-side damper half body, 201a . . . Inner circumferential boss part, 201b . . . Hollow circular wall part, 201c . . . Outer circumferential cylindrical part, 201s . . . Spline, 201d . . . Drive-side spring recess, 201g . . . Axis alignment recess, 201p . . . Relative rotation restricting projection,
202 . . . Driven-side damper half body, 202a . . . Inner circumferential boss part, 202b . . . Hollow circular wall part, 202s . . . Spline, 202d . . . Driven-side spring recess, 202g . . . Axis alignment projection, 202p . . . Relative rotation restricting recess,
203 . . . Coil spring.

The invention claimed is:

1. A powertrain structure comprising:
a drive shaft and a driven shaft disposed coaxially, with end surfaces opposed to each other, and
a torque damper interposed between the drive and driven shafts which permits power to be transmitted from the drive shaft to the driven shaft,
wherein:
the torque damper includes a drive-side damper half body fitted to a shaft end part of the drive shaft and a driven-side damper half body fitted to a shaft end part of the driven shaft, with the damper half bodies joined together such that relative rotation therebetween is restricted by engagement of circumferential end surfaces of the respective half bodies which are opposed to each other, and a damper spring interposed between the damper half bodies such that the damper spring straddles both a drive-side spring recess and a driven-side spring recess respectively formed, with openings opposed to each other, in the opposing circumferential end surfaces of the drive-side damper half body and the driven-side damper half body, and
one of a drive-side fitting part, which is formed between the drive-side damper half body and the shaft end part of the drive shaft, and a driven-side fitting part, which is formed between the driven-side damper half body and the shaft end part of the driven shaft, has a smaller clearance in a radial direction of the shafts and the other of the drive-side fitting part and the driven-side fitting part has a larger clearance in the radial direction of the shafts to allow the shaft body and the damper half body to move relative to each other in the radial direction.

2. The powertrain structure according to claim 1, wherein the drive-side fitting part and the driven-side fitting part are both splined, a groove depth of a spline of the one of the fitting parts larger than a groove depth of a spline of the other of the fitting parts.

3. The powertrain structure according to claim 2, wherein: the powertrain structure further comprises a drive-side support case which rotatably supports the drive shaft and driven-side support cases which rotatably support the driven shaft, and
the drive-side damper half body and the driven-side damper half body are fitted to respective ones of the shaft end parts which protrude outwardly of the powertrain structure.

4. The powertrain structure according to claim 2, wherein rotation center axes of the drive-side damper half body and the driven-side damper half body are aligned to be coaxial with each other, and an axis alignment recess and an axis alignment projection are respectively formed opposed to each other in the opposing circumferential end surfaces of the drive-side damper half body and the driven-side damper half body such that the projection and the recess contact with each other slidably in a relative rotation direction of the shafts when the damper half bodies are joined together, and such that the drive-side damper half body and the driven-side damper half body are also rotatable relative to each other.

5. The powertrain structure according to claim 4, wherein:
the torque damper includes a plurality of the damper springs interposed at equal intervals in circumferential direction of the damper half bodies such that the damper springs straddle the drive-side damper half body and the driven-side damper half body, and
the drive-side damper half body and the driven-side damper half body include said axis alignment recess and said axis alignment projection formed between each adjacent pair of the damper springs in the circumferential direction.

6. The powertrain structure according to claim 5, wherein:
a relative rotation restricting projection and a relative rotation restricting recess are formed opposed to each other in respective ones of the surfaces opposed to each other of the drive-side damper half body and the driven-side damper half body, and
the relative rotation restricting projection and the relative rotation restricting recess are fitted together with clearance therebetween such that they restrict the relative rotation between the drive-side damper half body and the driven-side damper half body to a predetermined range.

7. The powertrain structure according to claim 6, wherein:
the powertrain structure further comprises a drive-side support case which rotatably supports the drive shaft and driven-side support cases which rotatably support the driven shaft, and
the drive-side damper half body and the driven-side damper half body are fitted to respective ones of the shaft end parts which protrude outwardly of the powertrain structure.

8. The powertrain structure according to claim 6, wherein the relative rotation restricting projection and the relative rotation restricting recess are disposed at such positions of the opposed surfaces of the damper half bodies as not to interfere with the axis alignment recess and the axis alignment projection between adjacent ones of the damper springs.

9. The powertrain structure according to claim 8, wherein:
the powertrain structure further comprises a drive-side support case which rotatably supports the drive shaft and driven-side support cases which rotatably support the driven shaft, and
the drive-side damper half body and the driven-side damper half body are fitted to respective ones of the shaft end parts which protrude outwardly of the powertrain structure.

10. The powertrain structure according to claim 8, wherein the relative rotation restricting projection and the relative rotation restricting recess are disposed at positions of the opposed surfaces of the damper half bodies which are radially outward the axis alignment recess and the axis alignment projection between adjacent ones of the damper springs.

11. The powertrain structure according to claim 1, wherein rotation center axes of the drive-side damper half body and the driven-side damper half body are aligned to be coaxial with each other, and an axis alignment recess and an axis alignment projection are respectively formed opposed to each other in the opposing circumferential end surfaces of the drive-side damper half body and the driven-side damper half body such that the projection and the recess contact with each other slidably in a relative rotation direction of the shafts when the damper half bodies are joined together, and such that the drive-side damper half body and the driven-side damper half body are also rotatable relative to each other.

12. The powertrain structure according to claim 11, wherein:
the powertrain structure further comprises a drive-side support case which rotatably supports the drive shaft and driven-side support cases which rotatably support the driven shaft, and
the drive-side damper half body and the driven-side damper half body are fitted to respective ones of the shaft end parts which protrude outwardly of the powertrain structure.

13. The powertrain structure according to claim 11, wherein the torque damper includes a plurality of the damper springs interposed at equal intervals in circumferential direction of the damper half bodies such that the damper springs straddle the drive-side damper half body and the driven-side damper half body, and the drive-side damper half body and the driven-side damper half body include said axis alignment recess and said axis alignment projection formed between each adjacent pair of the damper springs in the circumferential direction.

14. The powertrain structure according to claim 13, wherein:
the powertrain structure further comprises a drive-side support case which rotatably supports the drive shaft and driven-side support cases which rotatably support the driven shaft, and
the drive-side damper half body and the driven-side damper half body are fitted to respective ones of the shaft end parts which protrude outwardly of the powertrain structure.

15. The powertrain structure according to claim 13, wherein:
a relative rotation restricting projection and a relative rotation restricting recess are formed opposed to each other in respective ones of the surfaces opposed to each other of the drive-side damper half body and the driven-side damper half body, and
the relative rotation restricting projection and the relative rotation restricting recess are fitted together with clearance therebetween such that they restrict the relative rotation between the drive-side damper half body and the driven-side damper half body to a predetermined range.

16. The powertrain structure according to claim 15, wherein the relative rotation restricting projection and the relative rotation restricting recess are disposed at such positions of the opposed surfaces of the damper half bodies as not to interfere with the axis alignment recess and the axis alignment projection between adjacent ones of the damper springs.

17. The powertrain structure according to claim 16, wherein the relative rotation restricting projection and the relative rotation restricting recess are disposed at positions of the opposed surfaces of the damper half bodies which are radially outward the axis alignment recess and the axis alignment projection between adjacent ones of the damper springs.

18. The powertrain structure according to claim 1, wherein:
the powertrain structure further comprises a drive-side support case which rotatably supports the drive shaft and driven-side support cases which rotatably support the driven shaft, and
the drive-side damper half body and the driven-side damper half body are fitted to respective ones of the shaft end parts which protrude outwardly of the powertrain structure.

19. A powertrain structure comprising:
a drive shaft and a driven shaft disposed coaxially, with end surfaces opposed to each other, and
a torque damper is interposed between the drive and driven shafts which permits power to be transmitted from the drive shaft to the driven shaft,
wherein:
the torque damper includes a drive-side damper half body fitted to a shaft end part of the drive shaft and a driven-side damper half body fitted to a shaft end part of the driven shaft, with the damper half bodies joined together such that relative rotation therebetween is restricted by engagement of circumferential end surfaces of the respective half bodies which are opposed to each other, and a damper spring interposed between the damper half bodies such that the damper spring straddles both a drive-side spring recess and a driven-side spring recess respectively formed, with openings opposed to each other, in the opposing circumferential end surfaces of the drive-side damper half body and the driven-side damper half body, and
one of a drive-side fitting part, which is formed between the drive-side damper half body and the shaft end part of the drive shaft, and a driven-side fitting part, which is formed between the driven-side damper half body and the shaft end part of the driven shaft, has a smaller clearance in a radial direction of the shafts and the other of the drive-side fitting part and the driven-side fitting part has a larger clearance in the radial direction of the shafts such that there is a margin for relative movement of the shaft body and the damper half body in a radial direction of the shafts.

* * * * *